3,133,962
PRODUCTION OF POLYCHLORPROPIONIC ACID CHLORIDES

Adolf Hrubesch, Ludwigshafen (Rhine), and Herbert Friederich, Worms, Germany, assignors to Badische Anilin- & Soda-Fabrik Aktiengesellschaft, Ludwigshafen (Rhine), Germany
No Drawing. Filed Oct. 18, 1960, Ser. No. 63,253
Claims priority, application Germany Oct. 20, 1959
4 Claims. (Cl. 260—544)

This invention relates to a chlorination process. In particular, it relates to a new process for the production of polychlorpropionic acid chlorides according to which polychlorpropionic acid chlorides of varying degrees of chlorination from trichlorpropionic acid chloride to perchlorinated pentachlorpropionic acid chloride are obtained in admixture and in good yields.

It is known that $\alpha,\beta$-dichlorsuccinic acid anhydride is obtained when chlorine is allowed to act on fused maleic anhydride at a pressure of at least 10 atmospheres, advantageously in the presence of iron chloride or other metal halides. Monochlormaleic anhydride is obtained as a by-product in this reaction. This compound, however, can be obtained preferentially by carrying out the chlorination as described in U.S. patent specification No. 2,342,173 in the presence of aluminium chloride as catalyst at an elevated temperature, especially with the simultaneous action of ultraviolet light. It is further known that dichlorpropionic acid and more highly chlorinated polychlorpropionic acids are obtained by reacting an $\alpha$-halogenpropionic acid with about an equimolecular amount of chlorine at eleated temperatures in the presence of a catalyst containing phosphorus.

The main object of the present invention is to provide a chlorination process which leads to polychlorpropionic acid chlorides and which starts from cheap and readily accessible initial materials not hitherto used for the production of polychlorpropionic acid chlorides. In a wider sense it is an object of this invention to widen the basis of starting materials available for the production of polychlorpropionic acid chlorides. Yet another object of the invention is to provide a catalyst which is not only suitable for promoting chlorination but also directs the reaction of the initial materials with chlorine in the direction of the formation of polychlorpropionic acid chlorides so that these can be obtained in good yields even when carrying out the chlorination on an industrial scale.

These and further objects, which will be apparent from the following description, are achieved and polychlorpropionic acid chlorides are obtained by allowing at least 3 mols and advantageously 3 to 20 mols of chlorine to act on each mol of maleic anhydride at temperatures of about 80° to 250° C. in the presence of a nitrogenous catalyst.

As nitrogenous catalysts there are used barbituric acids, N,N',N'',N'''-tetrachlorglyoxaldiureide, that is, a compound having the formula

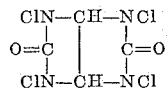

ureidocarboxylic acids derived from monobasic aliphatic carboxylic acids with 1 to 18 carbon atoms which are N-disubstituted by alkyl groups with 1 to 4 carbon atoms, acylated quaternary ammonium compounds derived from tertiary amines, advantageously a trialkylamine with 1 to 8 carbon atoms in each alkyl group, and acid chlorides of fatty acids with 1 to 4 carbon atoms, and carboxylic acid amides derived from benzoic acid or a monobasic aliphatic carboxylic acid with 1 to 18 carbon atoms or their chlorides or anhydrides and ammonia or a primary or secondary monoamine or diamine of the saturated aliphatic, araliphatic and cycloaliphatic series or the aromatic series which contain the amino groups attached to the aromatic ring.

Suitable barbituric acids are especially barbituric acid itself and also barbituric acids carbon-disubstituted by hydrocarbon radicals, especially by methyl to butyl groups or phenyl groups, such as dimethylbarbituric acid, diethylbarbituric acid, dipropylbarbituric acid, diallylbarbituric acid, dibutylbarbituric acid and phenylethylbarbituric acid. Teritary aliphatic amines which are used in the form of their acylated quaternary ammonium compounds are especially trialkylamines in which the amine nitrogen is attached to three alkyl groups of which each contains 1 to 8 carbon atoms. Suitable acylating agents are fatty acid chlorides of fatty acids with 1 to 4 carbon atoms.

Instead of the acylated quaternary ammonium compounds themselves, mixtures of tertiary amines with the said fatty acid chlorides may also be used from which the acylated quaternary ammonium compounds are then formed during chlorination.

Especially preferred catalysts are carboxylic acid amides of monobasic aliphatic carboxylic acids with 1 to 18 carbon atoms. Benzoic acid amides are also very effective catalysts. The monobasic aliphatic acids, also known as monocarboxylic acids, may be alkanoic like formic acid, acetic acid, propionic acid, butyric acid, caproic acid, caprylic acid, lauric acid, palmitic acid and stearic acid, or also branched, like 2-ethylhexanoic acid or substituted by a phenyl group, as in phenylacetic acid or phenylbutyric acid, or interrupted in the alkyl chain by a keto group, as in pyroacemic acid, acetoacetic acid or levulinic acid. Suitable bases for the acid amides concerned are ammonia or monoamines or diamines which contain at least one free hydrogen atom on at least one amine nitrogen. Primary or secondary monoamines and diamines which are derived from the saturated aliphatic, araliphatic and cycloaliphatic series or from the aromatic series with only one aromatic ring are preferred. Examples of amines are methylamine, dimethylamine, dipropylamine, dibutylamine, di-2-methylhexylamine, dilaurylamine, ethylene diamine, tetramethylene diamine, hexamethylene diamine, cyclohexylamine, dicyclohexylamine, benzylamine, dibenzylamine, aniline, methylaniline, toluidine, phenylene diamines and hexahydrophenylene diamines. Especially suitable aliphatic monoamines are those which contain on thhe nitrogen atom one or two alkyl radicals which may be identical or different and in which each alkyl radical bears 1 to 18 carbon atoms.

One or both alkyl groups can be replaced and/or substituted by a phenyl or toluyl radical or by cycloalkyl groups with 5 to 6 carbon atoms situated in the ring, which may be substituted by alkyl groups, especially one or two methyl groups. Diamines suitable as amine components for the production of the acid amides are especially those in which the two amino groups are separated by two to eight methylene groups. In the diamines also, the hydrogen atoms still attached to a nitrogen atom can be substituted down to at least one by alkyl groups with 1 to 4 carbon atoms, by a phenyl or toluyl radical or a 5- to 6-membered cycloalkyl radical.

Representatives of especially suitable carboxylic acid amides such as may be used as catalysts according to this invention include: formamide, methylformamide, dimethylformamide, diethylformamide, acetamide, N,N-dimethylacetamide, N,N-dipropylbutyramide, N,N-dibutylbutyramide, N-benzylbutyramide, N,N-dipropylethylhexanoic acid amide, lauroylanilide, stearoyl-benzylamide, acetoacetic acid-N,N-dibutylamide, acetoacetic acid anilide, benzamide, benzoic acid benzylamide, N,N-dimethylbenzoic acid amide. phenacylamide and N,N-diformylhexamethylene diamine.

It is not necessary to use as catalysts the ready-made amides, but rather the components from which they are made up can be used, for example a mixture of a primary or secondary monoamine or diamine of the abovementioned kind and one of the said monocarboxylic acids or acid chlorides derived therefrom, because the acid amides then form under the reaction conditions.

Chlorination is carried out by adding catalytic amounts of the catalyst, light, phosphorus or sulfur being unnecessary to initiate a starting reaction. In general, 0.2 to 10%, advantageously 0.5 to 5%, by weight, with reference to the amount of maleic anhydride to be chlorinated, are used. When using mixtures from which the amides or the acylated quaternary ammonium salts form, the amounts of catalyst are referred to the amount of amine. When using such mixtures from which the catalysts form during the reaction, it is not necessary to use for example the amine and the carboxylic acid chlorides, such as acetyl chloride, or the monocarboxylic acids, such as formic acid, butyric acid, stearic acid, acetoacetic acid, benzoic acid, phenylacetic acid and the like in stoichiometrical amounts. For example with mixtures which contain the amines and acid chlorides or acids or acid anhydrides in molar ratios of about 1:0.75 to 1:0.02, especially 1:0.7 to 1:0.5, good conversions and yields of polychlorpropionic acid chlorides can be obtained.

Chlorination may be carried out in the liquid phase or in the vapor phase.

The reaction can be carried out by adding the catalyst to the maleic anhydride in the amounts specified, heating the mixture and then leading chlorine into the mixture. It is preferable to work in a temperature range of about 100° to 250° C., advantageously between about 120° and 170° C., especially between 130° and 165° C. In order to achieve a good absorption of chlorine during chlorination when working in the liquid phase it is convenient to dip the chlorine inlet tube as far as possible into the mixture to be chlorinated, to choose the speed of the gas current not too high and to provide for a rapid and uniform dispersion of the gas in the chlorination mixture. The latter may be achieved in the usual way by introducing the gas simultaneously at several places and carrying out the introduction with the aid of frits, nozzles or filter candles or providing for the formation of small gas bubbles by powerful stirring of the chlorination mixture, for example with the aid of a high-speed stirrer. Although the most complete absorption of chlorine possible is desirable, and with slow introduction can substantially be achieved, it is for economical reasons convenient to introduce the chlorine more rapidly, for example about 600 to 2,000 liters, advantageously about 800 to 1,500 liters, per hour per kilogram of maleic anhydride, and to absorb about 30 to 50%, advantageously about 70 to 80%, by weight or more with reference to the amount introduced per hour.

The process may also be carried out continuously. When working continuously, the reaction is preferably carried out by leading the maleic anhydride in the vapor phase, possibly diluted with inert gases, such as nitrogen or carbon dioxide or also with vapors of inert solvents, such as chloroform, carbon tetrachloride or tetrachlorethane, through a reaction zone heated to about 140° to 170° C. and to supply at the same time about 3 to 20 mols of chlorine per mol of anhydride and the catalyst in the above-mentioned amounts to the reaction zone. About 50 to 150 grams of maleic anhydride are introduced into the reaction zone per hour per liter of reaction space. The anhydride may also be introduced into the reaction zone in liquid, for example fused, form. As the reaction zone there may be used for example a vertical tube which is conveniently filled with large-surfaced shaped articles of neutral reaction, for example pumice. When working continuously, there is the further advantage that the initial components can be metered well and that the composition of the desired chlorination product can be substantially controlled by the choice of the mol ratio of maleic anhydride to chlorine and the residence period, without appreciable amounts of byproducts being formed which would remain as residue in the distillative working up of the crude chlorination mixture.

The reaction takes place by splitting off phosgene and hydrogen chloride which are contained in the waste gas, possibly together with unabsorbed chlorine. The waste gas can be substantially condensed by strong cooling. The chlorine freed from hydrogen chloride recovered can be returned to the reaction zone, if desired together with the phosgene.

In general, the reaction ceases, as may be seen from the chlorine content of the waste gas, before the perchlorinated propionic acid chloride is contained in the chlorination mixture as the sole polychlor acid chloride. The products of the process are as a rule mixtures which contain polychlorpropionic acid chlorides of different degrees of chlorination from tri- to pentachlorpropionic acid chloride. The trichlor compound comprises mainly $\alpha,\beta,\beta$-trichlorpropionic acid chloride and the tetrachlor compound mainly $\alpha,\beta,\beta,\beta$- and a little $\alpha,\alpha,\beta,\beta$-tetrachlorpropionic acid chloride. The content of the desired polychlorpropionic acid chloride mixture in the reaction mixture can be substantially influenced by the amount of absorbed chlorine introduced, so that tri-, tetra- or pentachlorpropionic acid chloride may be obtained as the main product. For the production of polychlorpropionic acid chlorides with a high content of $\alpha,\beta,\beta$-trichlorpropionic acid chloride about 3 to 4 mols of chlorine are used up. The chlorination mixture then shows an increase in weight of about 20% by weight and has a refractive index of $n_a^{20}$ 1.4800 to 1.4950. The density is between about 1.50 and 1.60.

If chlorination is carried further, for example until the increase in weight of the chlorination mixture from the original weight is about 30% by weight, the main product is tetrachlorpropionic acid chloride (about 70% of the polychlorpropionic acid chlorides present in the mixture). The increase in weight of 50 to 60% by weight corresponds approximately to a chlorine conversion of 5 to 6 mols for 1 mol of maleic anhydride. In this case the proportion of pentachlorpropionic acid chloride preponderates in the chlorination mixture. By further treatment with chlorine the content of pentachlorpropionic acid chloride understandably increases further until as a rule after a chlorine consumption of about 6 to 7 mols of chlorine per mol of anhydride no further chlorine is reacted and the absorption of chlorine practically ceases. In this way a proportion of perchlorinated propionic acid chloride of about 80 to 90% of the total polychlorpropionic acid chlorides obtained is achieved.

Inert solvents may be present during chlorination. Suitable solvents include chloroform, carbon tetrachloride and tetrachlorethane. The solvent is in general present only in small amounts of for example 5 parts by weight per mol of anhydride because then no pressure process is needed to carry out the chlorination. It is however possible to work in the presence of larger amounts of solvent, for example 10 to 80 parts by weight per mol of anhydride.

Chlorination is as a rule carried out at atmospheric pressure. The use of increased pressure, for example of 1.5 to 20 atmospheres, is however possible and, when coemploying solvents, especially when large amounts are present, may even be necessary.

The working up of the reaction mixture takes place in the usual way by conventional methods, for example by distillation, advantageously under reduced pressure, or by crystallization. The polychlorpropionic acid chloride mixture obtained can be further separated into its components by fractional distillation. The individual propionic acid chlorides chlorinated to various extents are valuable intermediates. As such or in admixture, possibly after hydrolysis into the polychlorpropionic acids, they can be converted, for example by reaction with organic bases, such as urea, dimethylurea, phenylurea, hydrazine and α-methylphenylhydrazine, aromatic or heterocyclic amines, which may also be halogenated in the nucleus, or with carbamic acid, phenothiazine, acridine, chlorphenolates, naphtholates, into insecticidal or herbicidal substance such as can be used especially for controlling pests such as Drosophila, gnats or mosquitoes or locusts, or as herbicides, for example for controlling dicotyledons in grain fields.

The following examples will further illustrate this invention but the invention is not restricted to these examples. The parts are by weight.

Example 1

A mixture of 3,000 parts of maleic anhydride and 75 parts of dimethylformamide is heated to 120° C. in a vessel provided with a reflux condenser and a gas inlet tube. About 60 parts of chlorine per hour are then led into the mixture, the temperature being allowed to rise slowly to about 150° C. by the heat of reaction. After about 1,000 parts of chlorine have been introduced, another 60 parts of dimethylformamide are added to the mixture through the reflux condenser and introduction of chlorine is continued until the reaction mixture shows an increase in weight of 2,500 parts. This is the case after about 45 hours. 4,850 parts of crude reaction mixture are obtained.

By distilling the crude mixture at a pressure of 19 mm. Hg, a fraction weighing 2,920 parts is obtained between 50° C. and about 120° C. A residue of 1,850 parts remains in the distillation vessel and consists mainly of chlormaleic anhydride and its polymers. The distillate obtained at 19 mm. Hg between 50° and 120° C. is separated into two fractions by further distillation. The first fraction (boiling point at 15 mm. Hg, 51° to 68° C.) consists of a mixture of trichlor- and tetrachlorpropionic acid chloride and weighs 1,228 parts. It can be further separated into its components by fine distillation. The second fraction (boiling point at 15 mm. Hg, 98° to 99° C.) consists of 1,624 parts of pentachlorpropionic acid chloride. The product, which crystallizes upon prolonged standing, melts at 78° C. The structure of the compounds is confirmed by production of the 3,4-dichloranilides.

Example 2

1,000 parts of maleic anhydride are melted in a tubular vessel, 30 parts of N,N',N'',N'''-tetrachlorglyoxal diureide are added to the melt and chlorine is led in at a temperature of 150° C. to 155° C. in an amount of 160 parts per hour through a frit, provision being made for good dispersion by intensive stirring. The waste gas is cooled by means of a cooling brine at −15° C. so that readily condensable volatile chlorination products are deposited, at the beginning in solid form and toward the end in liquid form. These products are returned to the chlorination vessel. After 24 hours, the supply of chlorine is discontinued. The crude chlorination product weighs 1,620 parts, has a density of 1.71 and a chlorine content of 71% by weight. The refractive index $n\alpha^{20}$ is 1.5210.

The product is distilled and 1,050 parts of crude distillate of the boiling point 45° to 120° C. at 20 mm. Hg and a distillation residue of 520 parts are obtained. The residue contains 65.9% by weight of chlorine and has a refractive index $n\alpha^{20}$ of 1.5369. It consists substantially of a mixture of polymeric dichlor- and trichloracrylic acid chlorides.

The crude distillate yields, by a second vacuum distillation, a fraction of 308 parts of the boiling point 45° to 93° C. at 20 mm. Hg with a chlorine content of 73.0% by weight (C=18.3% H<0.5%) and a refractive index $n\alpha^{20}$ of 1.5048. It consists of trichlorpropionic acid chloride with about 20% by weight of monomeric trichloracrylic acid chloride. There are also obtained 685 parts of a fraction of the boiling point 93° to 108° C. at 20 mm. Hg which consists of a mixture of tetrachlor- and pentachlorpropionic acid chloride. The pentachlorpropionic acid chloride can be separated from the tetrachlorpropionic acid chloride by crystallization. 40 parts of pentachlorpropionic acid chloride are thus obtained which melts at 42° C.

By heating about equimolar parts of pentachlorpropionic acid chloride and 3,4-dichloraniline in pyridine or a benzene pyridine solution, the heptachloranilide of the melting point 116° C. is obtained after the usual working up.

If the tetrachlorpropionic acid chloride is reacted in the same way with 3,4-dichloranilide, the hexachloranilide of the melting point 76° to 77° C. is obtained. The anilides have insecticidal action.

Example 3

1 part of stearoylbenzylamide is added to 250 parts of maleic anhydride and the mixture heated to 160° C. Chlorine is led through the fused mixture in an amount of 80 parts per hour, care being taken that the temperature does not exceed 160° C. or fall below 148° C. After 15 hours, the melt has a weight of 310 parts and a density of 1.68. The chlorine content is 70.6% by weight. The refractive index $n\alpha^{20}$ is 1.5191.

By distillation there are obtained a first runnings of 22 parts (boiling point 45° to 95° C. at 20 mm. Hg) and 273 parts of a fraction of the boiling point 97° to 98° C. at 20 mm. Hg. This fraction consists of α,β,β-trichlorpropionic acid chloride. Between 96° and 115° C. at 14 mm. Hg, a mixture of tetrachlorpropionic acid chloride and pentachlorpropionic acid chloride distils over. The fraction weighs 35 parts and has a refractive index of $n\alpha^{20}$ 1.5177. By crystallization, 12 parts of pentachlorpropionic acid chloride and 21 parts of a mixture of a very small amount of α,α,β,β- and chiefly α,β,β,β,-tetrachlorpropionic acid chloride are obtained. The compounds are identified by means of their 3,4-dichloranilides. The anilides may be used as insecticides for controlling pests, such as red spider mites. They also have herbicidal properties.

By using 5 parts of stearoylcyclohexylamide instead of stearoylbenzylamide as chlorination catalyst and working otherwise in the same way, 241 parts of α,β,β-trichlorpropionic acid chloride are obtained by working up the 261 parts of crude chlorination mixture obtained after a chlorination period of 12 hours. The product contains small amounts of tetrachlor- and pentachlorpropionic acid chloride (about 5% by weight).

Example 4

250 parts of maleic anhydride and 10 parts of acetoacetic acid anilide are placed in a vessel which is provided with an efficient stirrer, an inlet tube with a frit and a reflux condenser. After the mixture has been heated to 148° C., a stream of chlorine of 130 to 160 parts per hour is led in. The temperature is kept between 148° and 155° C. Not all the chlorine is absorbed. The gas escaping during chlorination contains mainly hydrogen chloride, phosgene and unreacted chlorine. After 10 hours, the contents of the vessel have a weight of 310 parts. Chlorination is discontinued and 6 parts of a product melting above 260° C. are filtered off by suction. By vacuum distillation of the filtrate, 20 parts having a boiling point of 96° to 98° C. at 21 mm. Hg are obtained. This is a colorless liquid which has the refractive index $n\alpha^{20}$ 1.4879. This distillate consists of α,β,β-trichlorpropionic acid chloride ($C_3H_2Cl_4O$).

By working in exactly the same way and under the same conditions with the single exception that 10 parts of phenylacetylbenzylamide are used as chlorination catalyst instead of acetoacetic acid anilide, 310 parts of a liquid chlorination product are obtained from which by distillation under reduced pressure 270 parts of a fraction of the boiling point 97° C. at 21 mm. Hg are obtained. This fraction has a refractive index of $n\alpha^{20}$ 1.4858 and consists of α,β,β-trichlorpropionic acid chloride.

*Example 5*

In the apparatus described in Example 4, 250 parts of maleic anhydride are heated to 165° C. after the addition of 25 parts of N,N'-diformyl-1,6-diaminohexane. A stream of chlorine of 110 parts per hour is then led through the melt with powerful stirring. The temperature is not allowed to rise above 170° C. The contents of the vessel weigh 290 parts after the chlorination period of 8 hours. Chlorination is discontinued and the solid formed in the chlorination mixture is filtered off. The filter residue amounts to 60 parts. The filtrate is distilled under reduced pressure as usual. A fraction of the boiling point 97° to 99° C. at 21 mm. Hg is obtained in an amount of 205 parts. The fraction is liquid and colorless and has a refractive index of $n\alpha^{20}$ 1.4945. It consists to the extent of 96% of α,β,β-trichlorpropionic acid chloride. By reacting 100 parts of the product with 3,4-dichloraniline in pyridine, 152 parts of α,β,β-trichlorpropionyl-(3,4)-dichloranilide are obtained. The crude product melts at 115° to 117° C. It has insecticidal and also herbicidal activity.

*Example 6*

About 280 parts of chlorine per hour are led in finely dispersed condition and with powerful stirring through a mixture of 500 parts of maleic anhydride and 4 parts of N,N',N'',N'''-tetrachlorglyoxal diureide after heating to 150° C. After 8 hours, the chlorination mixture has a weight of 640 parts. By cooling the mixture, 74 parts of dichlormaleic acid anhydride of the melting point 108° C. crystallize out and are filtered off. By distilling the filtrate, 560 parts of a fraction of the boiling point 97° C. at 21 mm. Hg are obtained. The water-clear distillate has a refractive index of $n\alpha^{20}$ 1.4920 and consists to the extent of more than 95% by weight of α,β,β-trichlorpropionic acid chloride; the remainder is tetrachlorpropionic acid chloride.

By working in the same way under the same conditions with the difference that 20 parts of N,N'-dimethyl-ureidolauric acid are used instead of tetraglyoxal diureide, the chlorination mixture has a weight of 510 parts after 8 hours. After cooling, 204 parts of dichlormaleic anhydride are filtered off by suction. The filtrate (306 parts) consists of α,β,β-trichlorpropionic acid chloride. It boils at 97° to 98° C. at 21 mm. Hg and has a refractive index of $n\alpha^{20}$ 1.4836.

*Example 7*

After heating a mixture of 250 parts of maleic anhydride and 5 parts of benzoic acid-N-benzylamide to 140° C., about 160 parts of chlorine per hour are led through the mixture in finely dispersed condition with powerful stirring. After 10 hours, 310 parts of a pale yellow chlorination mixture are obtained from which after cooling 120 parts of dichloromaleic anhydride are filtered off. After working up the filtrate by distillation, 165 parts of trichloropropionic acid chloride (boiling point 97° to 98° C. at 20 mm. Hg) are obtained.

By adding a further batch of the same size to the 120 parts of dichlormaleic anhydride obtained and working otherwise in the way described above, 435 parts of crude chlorination product are obtained. By the usual working up there are obtained therefrom 182 parts of trichlorpropionic acid chloride (boiling point 93° to 95° C. at 14 mm. Hg) and 232 parts of a mixture consisting of only a small amount (31 parts) of tetrachlorpropionic acid chloride and mainly (195 parts) of pentachlorpropionic acid chloride.

*Example 8*

250 parts of maleic anhydride, after adding 9 parts of lauroylbenzylamide, are treated at 155° C. with 180 parts of chlorine per hour. After 10 hours, 336 parts of a dark yellow crude product are obtained from which 330 parts of α,β,β-trichlorpropionic acid chloride are obtained by distillation under reduced pressure. Analysis shows that less than 5% by weight of tetrachlorpropionic acid chloride are contained in the trichlorpropionic acid chloride.

By working in the same way with the single difference that 9 parts of lauroyllaurylamine are used as chlorination catalyst instead of lauroylbenzylamide, 340 parts of crude chlorination mixture are obtained after a chlorination period of 10 hours. 322 parts of trichlorpropionic acid chloride with less than 5% by weight of tetrachlorpropionic acid chloride are obtained therefrom by distillation.

*Example 9*

1,000 parts of maleic anhydride and 20 parts of normal-butyric acid-N-normal-propylamide are introduced into a vessel which is provided with an efficient stirrer, an inlet tube having a frit and a reflux condenser. The mixture is heated to 155° C. and chlorine then led in through the inlet tube and the frit in an hourly amount of 500 parts. The temperature is kept between 150° and 165° C. during chlorination. After 12 hours, the contents of the vessel weigh 1,380 parts. Chlorination is discontinued and by distilling the dark brown crude product, 1,220 parts of a colorless oil of the boiling point 97° C. at 21 mm. Hg are obtained. The distillate has a refractive index of $n_a^{20}$ 1.4902 and consists to the extent of about 95% by weight of α,β,β-trichlorpropionic acid chloride and 5% of tetrachlorpropionic acid chloride. A fraction of 112 parts of the boiling point 116° C. at 25 mm. Hg crystallizes after some days and consists mainly of pentachlorpropionic acid chloride.

*Example 10*

In the chlorination apparatus described in Example 9, 400 parts of maleic anhydride, after adding 20 parts of barbituric acid, are chlorinated for 12 hours, the temperature being kept between 148° C. and 155° C. The amount of chlorine is 220 parts per hour. After 12 hours, 470 parts of a crude chlorination mixture are obtained from which crystals separate after cooling to room temperature. The solid substance is filtered off by suction and 32 parts which melt above 260° C. are obtained. By distilling the filtrate, a fraction of the boiling point 97° C. is obtained. This fraction weighs 410 parts and has a refractive index of $n_a^{20}$ 1.4884. It consists to the extent of 95% by weight of trichlorpropionic acid chloride. The remaining portion is mainly tetrachlorpropionic acid chloride.

By working in the same way under the same conditions but with the difference that 15 parts of 5-(C)-dimethyl-substituted barbituric acid are used as chlorination catalyst instead of barbituric acid, 448 parts of crude chlorination product are obtained after chlorination for 10 hours. After cooling the crude product, 23 parts of a crystalline substance can be filtered off by suction which melts above 260° C. By distilling the filtrate, 403 parts of a fraction of the boiling point 95° to 96° C. at 18 mm. Hg are obtained. The fraction, which has the refractive index $n_a^{20}$ 1.4912, consists to the extent of about 95% by weight of trichlorpropionic acid chloride. The remainder is mainly tetrachlorpropionic acid chloride.

*Example 11*

500 parts of maleic anhydride are heated to 160° C. in a stirring vessel which is provided with a reflux condenser and with a gas inlet tube having a frit. 15 parts of benzamide are introduced into the melt, the temperature is kept between 160° and 165° C. and 600 parts of chlorine per hour are led in through the gas inlet tube and frit. The waste gas escapes through the reflux condenser. It is freed from chlorine, hydrogen chloride and phosgen in intense cooling apparatus.

After 8 hours, chlorination is discontinued. The chlorination mixture is dark in color and consists of 580 parts. 90 parts of solid of the melting point 71° C. are filtered off therefrom after cooling. It consists mainly of pentachlorpropionic acid chloride. By distillation of the filtrate, a fraction is obtained with the boiling point 97° to 98° C. at 21 mm. Hg which consists of 480 parts of an oily liquid. The oil has a refractive index of $n_a^{20}$ 1.4990 and consists to the extent of more than 95% by weight of α,β,β-trichlorpropionic acid chloride. The remaining portion is mainly tetrachlorpropionic acid chloride.

By working in the same way but using 20 parts of benzoic acid anilide as chlorination catalyst instead of benzamide, a crude chlorination mixture is obtained after chlorination for 10 hours which yields 75 parts of pentachlorpropionic acid chloride and 460 parts of a mixture consisting to the extent of about 95% by weight of α,β,β-trichlorpropionic acid chloride and about 5% by weight of tetrachlorpropionic acid chloride.

*Example 12*

250 parts of maleic anhydride to which 10 parts of the adduct of acetyl chloride and tributylamine have been added as catalyst are heated to 130° C. and chlorinated as described in Example 11. Chlorination takes place with the introduction of 210 parts of chlorine per hour. The addition of chlorine is discontinued after 10 hours. 280 parts of crude chlorination mixture are obtained with a refractive index of $n\alpha^{20}$ 1.4980. Distillation of the mixture gives 240 parts of a distillate of the boiling point 97° C. to 99° C. at 20 mm. Hg. The distillate consists of a mixture of trichlorpropionic acid chloride and tetrachlorpropionic acid chloride in which the proportion of trichlorpropionic acid chloride is about 90% by weight.

*Example 13*

A stream of nitrogen of about 10 liters (NTP) per hour is led through maleic anhydride heated to 190° C. The gas/vapor mixture thus obtained, which entrains about 60 grams of anhydride per hour, is led into the top of a vertically arranged tube 100 cm. in length and 3.5 cm. in diameter which is charged with pieces of pumice and has been heated to 155° C. At the same time 150 liters (NTP) of chlorine are led into the top of the tube and an hourly amount of 3 grams of normal-butyric acid-di-N,N-dipropylamide is dripped in uniformly over the period.

The gas leaving the tube at the bottom is led through a vessel cooled with cooling brine at −15° C., in which the condensed components are collected. After 8 hours, chlorination is discontinued. The condensate collected in the cooled receiver, which contains some solid crystals, weighs 628 grams and has the refractive index $n\alpha^{20}$ 1.4925. The crystals are filtered off by suction and 103 grams of pentachlorpropionic acid chloride of the melting point 40° to 41° C. are obtained. Distillation of the filtrate gives a fraction of the boiling point 101° to 104° C. at 23 mm. Hg. It consists of 486 grams. The refractive index is $n\alpha^{20}$ 1.4825. The fraction consists of a mixture of trichlorpropionic acid chloride and tetrachlorpropionic acid chloride in which the proportion of trichlorpropionic acid chloride amounts to about 80% by weight.

*Example 14*

A vertically arranged tube 100 cm. in length and having a diameter of 3.5 cm. is charged with pieces of pumice having a diameter of 4 to 6 mm. The tube is heated to about 155° to 165° C. During each hour, 50 grams of a mixture, preheated to 100° C., of 600 grams of maleic anhydride and 25 grams of N,N-dimethylacetamide are supplied to the top of the tube, and at the same time 110 liters of chlorine per hour are led into the tube at the top. The vapor and drops of liquid leaving the bottom of the tube are cooled in a first separator to about 140° C., about 10 grams of liquid separating out per hour. The product consists of a mixture consisting to the extent of more than 95% by weight of pentachlorpropionic acid chloride.

The uncondensed vapor leaving the first separator is led into a second separator, the internal temperature of which is kept at about 0° to −5° C. by cooling with cooling brine at −15° C. In this second separator about 60 grams of a pale yellow colored liquid collect which has a refractive index of $n\alpha^{20}$ 1.5192. The liquid consists of a mixture of trichlorpropionic acid chloride, tetrachlorpropionic acid chloride and pentachlorpropionic acid chloride. The proportion of pentachlorpropionic acid chloride in the mixture is about 92% by weight while the remaining portion consists of nearly equal parts of trichlor- and tetrachlorpropionic acid chloride.

From the vapor leaving the second separator, which contains hydrogen chloride as well as chlorine and phosgene, the chlorine and phosgene are separated by strong cooling (−40° C.) and the hydrogen chloride then absorbed in water.

The chlorine containing phosgene liquefied by strong cooling is led back into the chlorination tube.

What we claim is:

1. A process for the production of polychlorpropionic acid chlorides which comprises reacting maleic anhydride with 3 to 20 mols of chlorine per mol of anhydride at a temperature between 120° to 170° C. in the presence of at least one nitrogenous catalyst selected from the group consisting of barbituric acid; 5,5-dialkyl barbituric acids in which the alkyls are methyl to butyl; N,N',N'',N'''-tetrachlorglyoxal diureide; N,N'-dialkyl substituted ureido carboxylic acids in which the N-substituents are alkyl groups with 1 to 4 carbon atoms and in which the carboxylic acid is an alkanoic acid with 1 to 18 carbon atoms; acylated quaternary ammonium compounds of a trialkylamine with 1 to 8 carbon atoms in each alkyl and an alkanoic acid with 1 to 4 carbon atoms; benzoic acid amide; benzoic acid anilide; N-benzoyl benzamide; acetoacetic acid anilide; phenylacetyl benzamide; and amides of an alkanoic acid with 1 to 18 carbon atoms and an N-base with at least one free hydrogen atom selected from the group consisting of ammonia, primary alkylmonoamines with 1 to 18 carbon atoms, dialkylmonoamines with 1 to 18 carbon atoms in each alkyl group, diamines in which the two amino groups are separated by 2 to 8 methylene groups, mono- and di-cycloalkylamines possessing 5- to 6-membered rings, benzylamine, and aniline.

2. A process as claimed in claim 1 wherein an N,N'-dialkyl substituted ureido carboxylic acids in which the N-substituents are alkyl groups with 1 to 4 carbon atoms and in which the carboxylic acid is an alkanoic acid with 1 to 18 carbon atoms is used as catalyst.

3. A process as claimed in claim 1 wherein the maleic anhydride is used in the vaporous phase and the reaction is carried out continuously in a reaction zone heated to 120° to 170° C.

4. A process as claimed in claim 1 wherein an N-alkyl substituted alkanoic acid having 1 to 18 carbon atoms, the N-alkyl group also containing 1 to 18 carbon atoms, is used as the chlorination catalyst.

References Cited in the file of this patent

FOREIGN PATENTS 193,399   Austria _____ Nov. 25, 1957

OTHER REFERENCES

Bohme et al.: Ber. Deut. Chem., Volume 88, pages 354–357 (1955).